United States Patent
Maeng

(10) Patent No.: US 8,570,394 B1
(45) Date of Patent: Oct. 29, 2013

(54) SYSTEMS, METHODS, AND MEDIUMS FOR ADJUSTING AN EXPOSURE OF AN IMAGE USING A HISTOGRAM

(75) Inventor: Joon Maeng, Newcastle, WA (US)

(73) Assignee: Intellectual Ventures Fund 79 LLC, Las Vegas, NV (US)

( * ) Notice: Subject to any disclaimer, the term of this patent is extended or adjusted under 35 U.S.C. 154(b) by 179 days.

(21) Appl. No.: 13/008,844

(22) Filed: Jan. 18, 2011

(51) Int. Cl.
*H04N 5/228* (2006.01)
*H04N 5/235* (2006.01)
*H04N 5/222* (2006.01)
*G06K 9/00* (2006.01)
*G06K 9/34* (2006.01)

(52) U.S. Cl.
USPC ............... 348/222.1; 348/221.1; 348/333.02; 348/362; 382/168; 382/171; 382/169

(58) Field of Classification Search
USPC ......... 348/221.1, 222.1, 333.02, 333.03, 254, 348/362–366, 671, 672, 251, 615; 382/168, 382/169, 170, 171, 312, 172
See application file for complete search history.

(56) References Cited

U.S. PATENT DOCUMENTS

| | | | | |
|---|---|---|---|---|
| 7,702,151 B2 * | 4/2010 | Takahashi | ..................... | 382/169 |
| 8,031,968 B2 * | 10/2011 | Ishiga | ............................ | 382/275 |
| 8,155,474 B2 * | 4/2012 | Han et al. | ...................... | 382/274 |
| 8,248,492 B2 * | 8/2012 | Mitsunaga | .................... | 348/252 |
| 2004/0012700 A1 * | 1/2004 | Okisu et al. | .............. | 348/333.01 |
| 2004/0119841 A1 * | 6/2004 | Shimizu | ..................... | 348/222.1 |
| 2007/0269132 A1 * | 11/2007 | Duan et al. | .................... | 382/274 |
| 2007/0291152 A1 * | 12/2007 | Suekane et al. | .......... | 348/333.02 |
| 2009/0251568 A1 * | 10/2009 | Nakatani | ....................... | 348/234 |
| 2011/0001841 A1 * | 1/2011 | Shiraishi et al. | ........... | 348/223.1 |
| 2011/0254949 A1 * | 10/2011 | You | ............................... | 348/135 |

* cited by examiner

*Primary Examiner* — Nhan T Tran
*Assistant Examiner* — Marly Camargo
(74) *Attorney, Agent, or Firm* — Stolowitz Ford Cowger LLP

(57) ABSTRACT

The present disclosure describes systems, methods, and mediums for adjusting an exposure of a digital image using a histogram. The systems, methods, and mediums may include generating, by a computing device, a histogram associated with plurality of pixels in an image and enabling adjustment of the histogram to generate an adjusted histogram. The systems, methods, and mediums may further include generating, by the computing device, at least one adjusted control setting by adjusting at least one control setting in response to generation of the adjusted histogram and capturing the image in a memory device in response to generating the at least one adjusted control setting.

39 Claims, 5 Drawing Sheets

SYSTEMS, METHODS, AND MEDIUMS FOR ADJUSTING AN EXPOSURE OF AN IMAGE USING A HISTOGRAM

TECHNICAL FIELD

The present disclosure is related to systems, methods, and mediums for adjusting an exposure of an image using a histogram.

BACKGROUND

Known digital cameras automatically may determine an exposure for a scene using a light meter. One disadvantage of known digital cameras occurs when the scene includes portions that are much brighter or much darker than other portions of the scene, for example, a person standing in front of a brightly lit window. Light meters in some known digital cameras incorrectly may measure the brighter portions of the scene, e.g., the window, as having a higher light intensity than actually is present in the scene. A resulting photograph may exhibit an overexposed, overly bright window with an underexposed, overly dark person standing in front of the window, neither with sufficient detail. Known digital cameras do not have a dynamic brightness range, a brightness adaptation, or a brightness discrimination of human eyes. Such disadvantages adversely may affect a quality of the resulting photograph.

BRIEF DRAWINGS DESCRIPTION

DETAILED DESCRIPTION

Figure 1A:
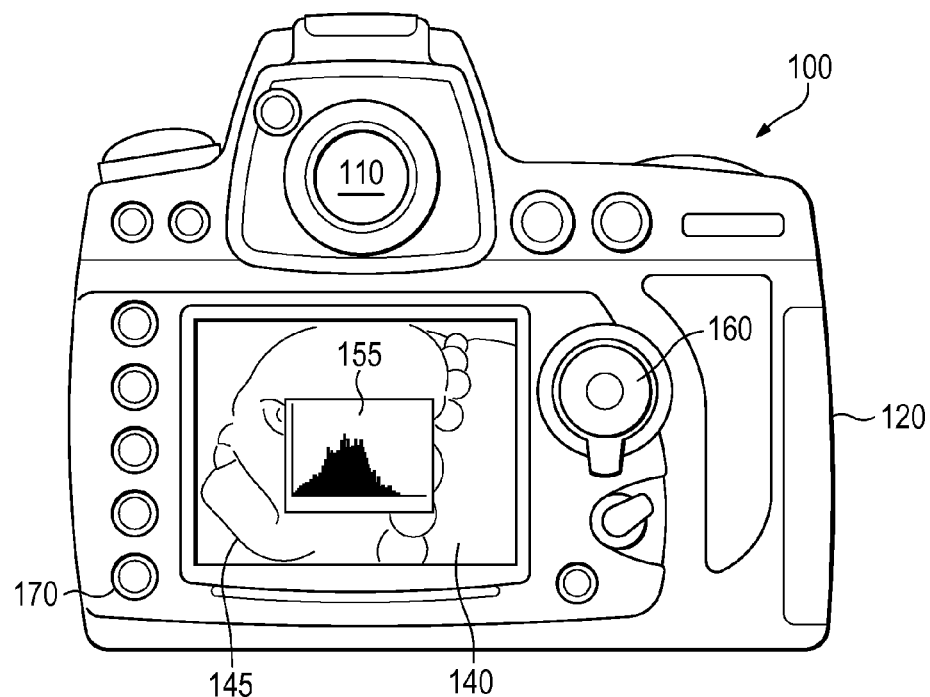
FIGS. 1A and 1B depict an illustration of an exemplary system configured to adjust an exposure of an image.
Figure 1B:
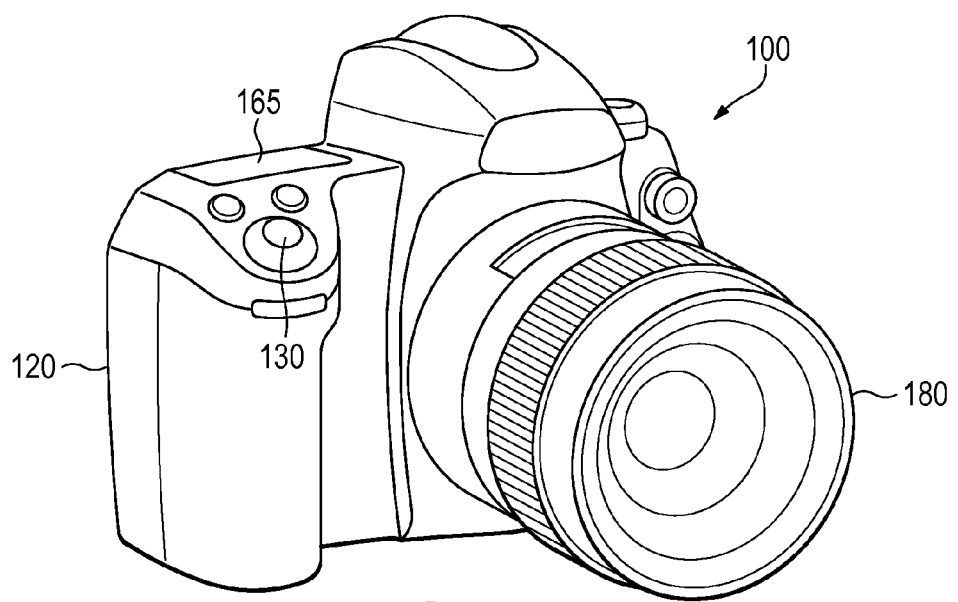
Figure 2:
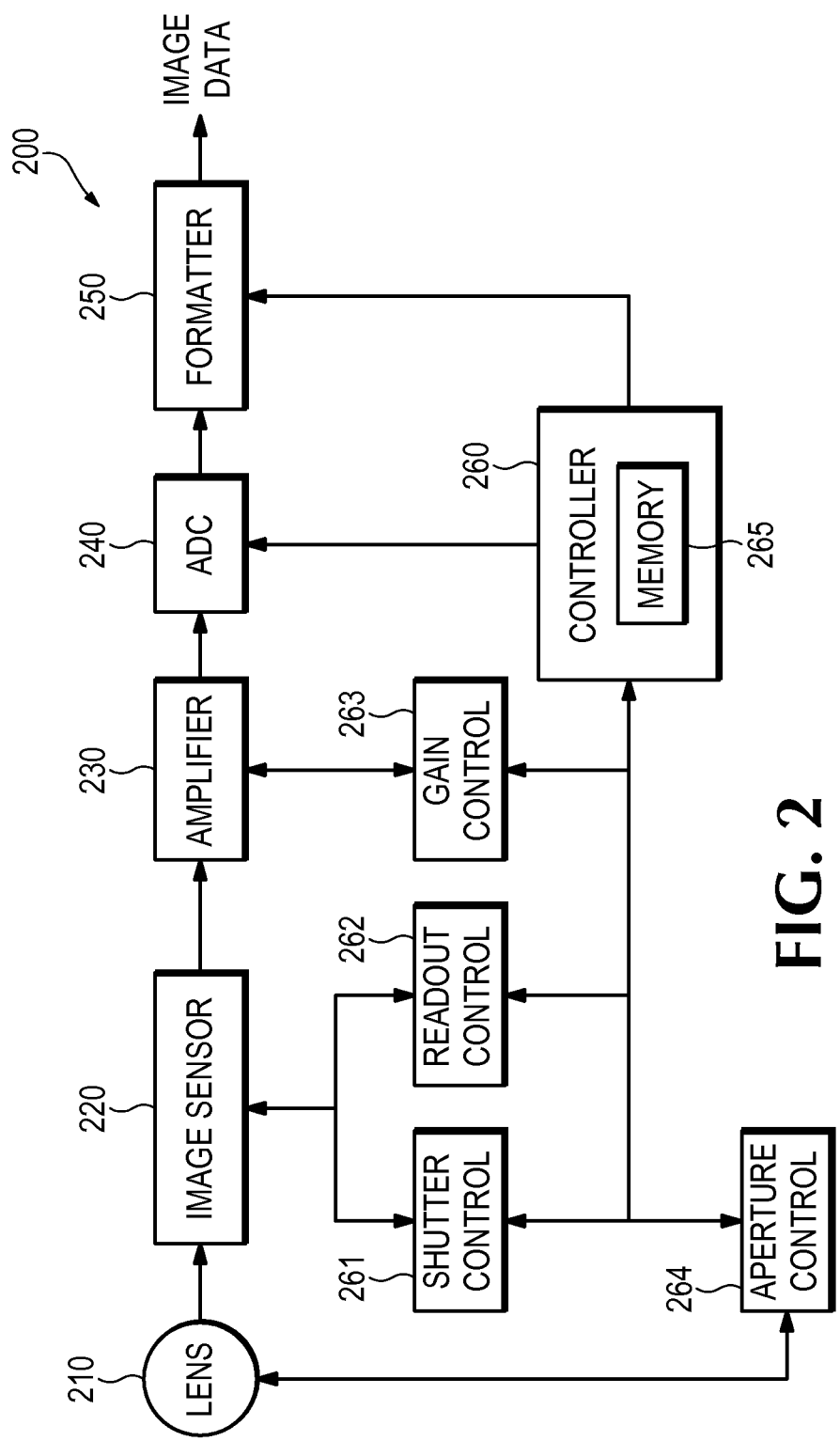
FIG. 2 depicts a block diagram of another exemplary system configured to adjust an exposure of an image.

FIGS. 1A and 1B depict an illustration of an exemplary system 100 configured to adjust an exposure of an image. FIG. 2 depicts a block diagram of an exemplary system 200 configured to adjust an exposure of an image. Referring to FIGS. 1A, 1B, and 2, a body 120 may house a viewfinder 110, a shutter release switch 130, a controller switch 160, a menu selection switch 170, a monitor 140, and a control panel 165, or any combination thereof. Body 120 may be sized variously depending on a desired form factor, a system type, a field of use, a market segment, or the like. For example, body 120 may be sized to fit substantially in a palm of a user when portability of system 100 is an important feature of system 100 and/or system 200. Body 120 may be sized larger than the palm of the user when body 120 is designed to be coupled to and to support a long focal length lens, e.g., a lens 180.

Viewfinder 110 may include a window that may allow a user to compose, focus, and otherwise identify a scene before capturing the scene as an image stored in system 100. Viewfinder 110 may be associated with an internal and/or an external optical system (not shown), e.g., lens 180, a mirror, a prism, a filter, or the like, or any combination thereof. Viewfinder 110 may be optical or electronic. A user may view a scene captured by an image sensor through viewfinder 110.

Shutter release switch 130 may enable capturing of a scene. When pressed, shutter release switch 130 may release or open a shutter (not shown) in system 100, then close the shutter, allowing an exposure time as determined by a shutter speed setting. Shutter release switch 130 may actuate a mechanical shutter or an electronic shutter, or a combination thereof. Shutter release switch 130 may be a switch, a button, a wheel, or any other physical or virtual device configured to actuate the shutter.

Monitor 140 may display a previously sensed or stored image or thumbnails of previously sensed or stored images, as well as display information associated with the sensed or stored image and/or thumbnails. Monitor 140 also may display a settings menu to enable the navigation, selection, and modification of control settings for system 100. A user may toggle or otherwise actuate controller switch 160 in any axis to navigate a settings menu displayed on monitor 140. Monitor 140 may highlight a menu item associated with a particular position or movement of controller switch 160. A user may select the highlighted menu item by actuating controller switch 160 and/or by actuating menu selection switch 170. Control settings may include portrait mode, landscape mode, flash, aperture priority mode, shutter priority mode, shutter speed, aperture, International Standards Organization (ISO) speed, image resolution, image stabilization, image format, focal length, depth of field, white balance, exposure compensation, red-eye removal, effects filters, automatic monitor settings, metering modes, alerts, actuation sounds, manual, or the like, or any combination thereof.

System 100 may operate in a manual mode or an automatic mode or any combination thereof in response to a mode setting set using controller switch 160 and/or menu selection switch 170. In the manual mode, a user may manually adjust camera settings including setting an aperture and/or a shutter speed using controller switch 160 and/or menu selection switch 170. In the automatic mode, system 100 automatically may choose at least a portion of the available settings based on its sensor or other inputs.

One of ordinary skill in the art readily will understand that a variety of devices, such as cameras, personal digital assistants, cellular phones, computers, video cameras, infrared cameras, medical imaging devices, or the like, and/or any other device, handheld or otherwise, digital or otherwise, that are capable of sensing, capturing, and/or storing an image in any manner, may be used to implement examples within contemplation of system 100.

A user may compose an image 145 by directing the device implementing system 100 to a scene or a subject. Monitor 140 may display the scene or the subject, which also may be viewable through viewfinder 110. In an example, the user may select an appropriate control setting to cause display of a histogram 155 superimposed on or instead of image 145. Monitor 140 may display histogram 155 in any size and in any location on monitor 140. Monitor 140 may display histogram 155 alternately with image 145. In an example, monitor 140 may display image 145 while control panel 165 displays histogram 155. Control panel 165 may display histogram 155 substantially simultaneously, sequentially, or otherwise with the display of image 145.

Histogram 155 may correspond to a graphical representation of a distribution of brightness or luminance levels for each pixel in image 145. A horizontal x-axis of histogram 155 may indicate the brightness or luminance levels, such as from darkest to lightest. The brightness or luminance level for a pixel may be a discrete value within some fixed range, for instance, between 0 and 255. A vertical axis of histogram 155 may indicate a number of pixels found at any particular brightness or luminance level. Histogram 155 may use a collection of densely placed bars to indicate the number of pixels at each brightness or luminance level. A left side of the horizontal x-axis may represent black and dark areas, a middle portion of the x-axis may represent medium grey, and a right side of the horizontal x-axis may represent light and pure white areas. A vertical y-axis may represent a size of an area that is captured in each one of these zones. Thus, for a very bright image with few dark areas and/or shadows, histogram 155 may have most of its data points on the right side and the middle portion of the graph. Conversely, for a very dark image, histogram 155 may have the majority of its data points on the left side and the middle portion of the graph. Histogram 155 may change as the scene or the subject changes or as control settings on system 100 change. Histogram 155 may be a luminance histogram or a color histogram representing red, blue, or green colors, or any combination thereof.

Referring to FIG. 2, a lens system 210 may focus light reflected from a scene onto an image sensor 220 that converts the light into electrical charges. Image sensor 220 may comprise a grid of capture devices, e.g., a grid of capacitors or transistors or any combination thereof (not shown). Image sensor 220 may sense the scene by converting light focused on the scene into electrons that charge the capture devices. The more intense the light is at each capture device, the greater the charge accumulated in the capture device. Image sensor 220 may include a Charge Coupled Device (CCD) or a Complementary Metal Oxide Semiconductor (CMOS) device.

To obtain a color image, system 200 also may include a beam splitter (not shown) configured to split the light into a plurality of components, e.g., red, blue, and green components and to send each component to a corresponding grid of capture devices. One of ordinary skill in the art readily will understand that system 200 may employ other methods of recording color in an image, such as using filters alone or in combination with algorithms, other circuits, or any combination thereof.

An amplifier 230 may amplify analog signals read out from image sensor 220 by a gain control circuit 263 in response to a controller 260. An Analog to Digital Converter (ADC) 240 may convert the amplified analog signals output from amplifier 230 to corresponding digital signals. A formatter 250 may format or compress digital signals output from the ADC 240 in preparation for storing or transmitting the image. Formatter 250 also may format the digital signals to one of several raw image formats that contain minimally processed data from image sensor 220. For example, formatter 250 may encrypt portions of the digital data signals output from ADC 240. Raw files are so named because they are not yet processed and therefore are not ready to be printed or edited with a bitmap graphics editor. Raw image files are oftentimes referred to as digital negatives as they fulfill the same role as negatives in film photography: that is, the negative is not directly usable as an image, but has all the information needed to create an image.

Formatter 250 may compress the digital signals using any number of digital data compression formats standardized or otherwise, including Joint Photographic Experts Group (JPEG), Tagged Image File Format (TIFF), Portable Network Graphics (PNG), Graphics Interchange Format (GIF), Bitmaps (BMP), or the like.

Controller 260 may include a memory 265 configured to store instructions that, in response to execution by controller 260, cause controller 260 to perform operations including adjusting an exposure of an image. Memory 265 also may store still images or videos of live subjects. Memory 265 may include volatile and non-volatile memory devices, such as Random Access Memory (RAM), Dynamic Random Access Memory (DRAM), Static Random Access Memory (SRAM), flash memory, Read Only Memory (ROM), or the like, or any combination thereof. Memory 265 may be a device integral to controller 260 or may be a device distinct from controller 260.

Controller 260 may include one or more processing devices configured to operate or to control system 200. Controller 260 may be configured to read the instructions stored in memory 265 and to configure system 200 in a variety of ways.

Controller 260 automatically may determine a shutter speed of sensing elements in image sensor 220, readout method, amplifier gain, aperture size, or the like, or any combination thereof. In an example, controller 260 may determine shutter speed of the sensing elements in image sensor 220 through shutter control circuit 261. Controller 260 also may determine readout method, amplifier gain, and aperture size through readout control circuit 262, gain control circuit 263, and aperture control circuit 264, respectively.

Controller 260 may connect, couple, or otherwise interface with a wired or a wireless network. Controller 260 may enable uploading of an image from system 200 to the wired or wireless network or may enable downloading images or other files or data, executable or otherwise, from the wired or wireless network. Controller 260 further may enable updating firmware, drivers, and/or the like associated with system 200.

Controller 260 may receive signals from any mechanism that is configured to provide input to system 200. Controller 260 may receive input from buttons, toggle switches, wheels, touch screens, microphones, actuators, or the like, or any combinations thereof, that is configured to be enabled or actuated, either manually by a user or automatically by system 200, in response to signals, indications, stimuli, or the like, or any combination thereof. In one example, controller 260 may receive input from shutter release switch 130, control switch 160, or menu selection switch 170.

Controller 260 may interface, control, or otherwise communicate with any mechanism configured to allow system 200 to provide output to the wired or wireless networks, to users, or to the like, or any combination thereof. Controller 260 may interface with monitor 140 to indicate a status of various settings of system 200, to display one or more images, or the like, or any combination thereof. Controller 260 also may control speakers (not shown) to generate sound, such as sound associated with various settings or status of system 200.

One of ordinary skill in the art readily will understand that a variety of devices, such as cameras, personal digital assistants, cellular phones, computers, video cameras, infrared cameras, medical imaging systems, or the like, and/or any other device, handheld or otherwise, digital or otherwise, that are capable of sensing, capturing, and/or storing an image for any purpose, may be used to implement examples within contemplation of system 200.

Figure 3A:
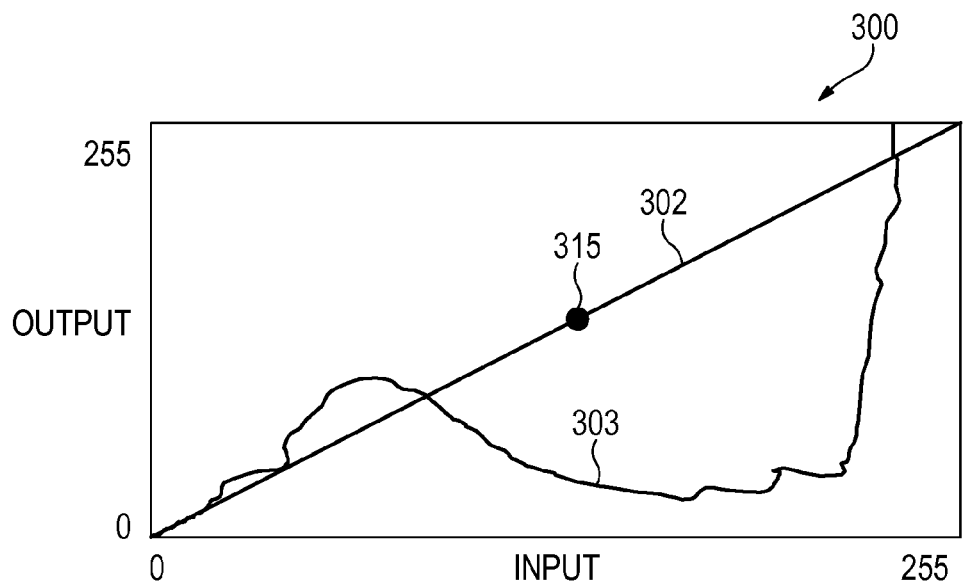
FIGS. 3A and 3B depict an exemplary manner of adjusting an exposure of an image using a histogram.
Figure 3B:
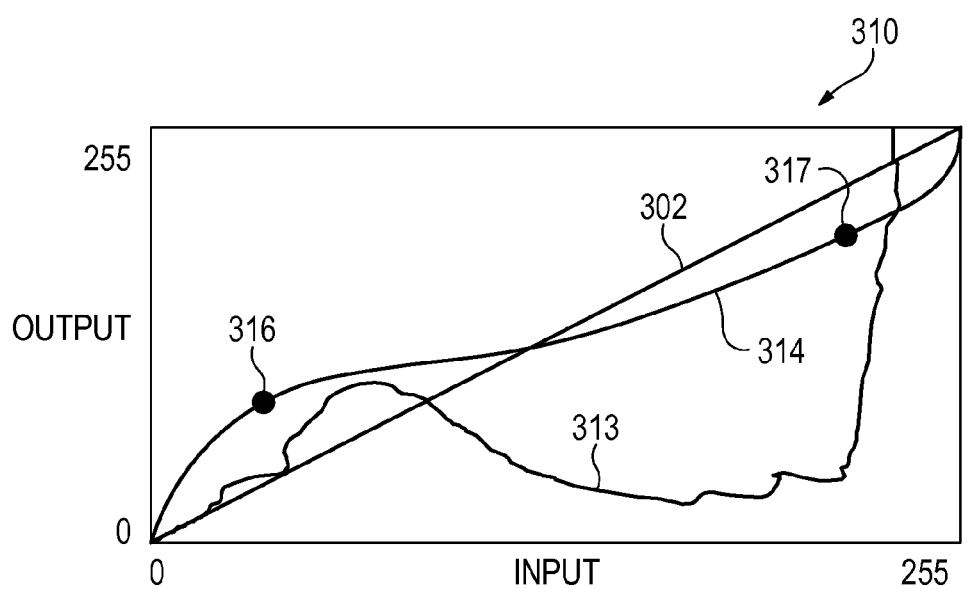

FIGS. 3A and 3B depict an exemplary manner of adjusting an exposure of an image using a histogram 300. Referring to FIGS. 1A, 1B, 2, 3A, and 3B, system 100 may display a histogram 155 on monitor 140, e.g., superimposed on image 145. One example of histogram 155 is shown as histogram 300 on FIG. 3A. Histogram 300 may include a line 303 representing a distribution of pixel values in image 145. Unlike histogram 155, an x-axis of histogram 300 may represent input values and a y-axis of histogram 300 may represent output pixel values. Both input and output pixel values may have an associated range, e.g., 0 (dark) to 255 (light). A diagonal line 302 may run diagonally either from a lower left to an upper right value or from an upper left to a lower right value. Diagonal line 302 may represent input pixel values that are the same as output pixel values. For example, an output pixel value and an input pixel value in a center of diagonal line 302 may be 127.

System 100 initially may locate a dot 315 in the center of diagonal 302. In one example, a user may move dot 315 to the left or to the right along diagonal 302 and then up or down to adjust an exposure of image 145. The user may move dot 315 using any mechanism that is configured to provide input to system 100 or to system 200. In one example, the user may move dot 315 using control switch 160 alone or in combination with menu selection switch 170.

By moving dot 315 along diagonal 302 and then up or down, the user may modify an input pixel value from a value corresponding to diagonal 302 to an output pixel value corresponding to a destination location 316 of dot 315 on a modified line 314. Adjusted histogram 310 is an example of moving dot 315 from e.g., from the initial location at the center of diagonal 302 to destination 316, e.g., by actuating control switch 160 alone or in combination with menu selection switch 170. Line 314 may bow or move relative to diagonal 302, which results in a value of the input pixel values changing to the output pixel values indicated at destination 316. For example, the input pixel values may change from an input value of, e.g., 50, as indicated by diagonal 302, prior to the user moving dot 315 from the center of diagonal 302 to an output value of, e.g., 65, in response to the user moving dot 315 to destination 316. The user may indicate a final placement of dot 315 at destination 316 by actuating control switch 160 alone or in combination with menu selection switch 170. Doing so, may result in all pixels having an input value as indicated by the diagonal 302, e.g., pixels having an input value of 50, changing to an output value as indicated by modified line 314 after placing dot 315 at destination 316, e.g., output value of 65. Similarly and for another example, the input pixel values change from an input value of, e.g., 35, to an output pixel value of, e.g., 200, in response to the user moving dot 315 to a destination 317.

System 100 may generate a new dot in the center of line 314 after the user indicates a final placement of dot 315 at destination 316 or at destination 317. A user may move dots as desired on diagonal 302 or line 314 to change the input pixel values as desired to thereby change an exposure of particular pixels of the image 145. The values on line 314 become target values that system 100 or system 200 may use to set one or more control settings to capture the image 145 in memory 265. System 100 may set any number of control settings, including aperture, shutter speed, amplifier gain, or the like, or any combination thereof.

Monitor 140 may show histogram 155 superimposed on or instead of image 145. Monitor 140 may alternate the display of image 145 with histogram 155. In each example, a user may modify histogram 155 and system 100 may show the changes on image 145 to allow the user to determine whether the modifications to histogram 155 produce the desired changes to image 145.

Figure 4:
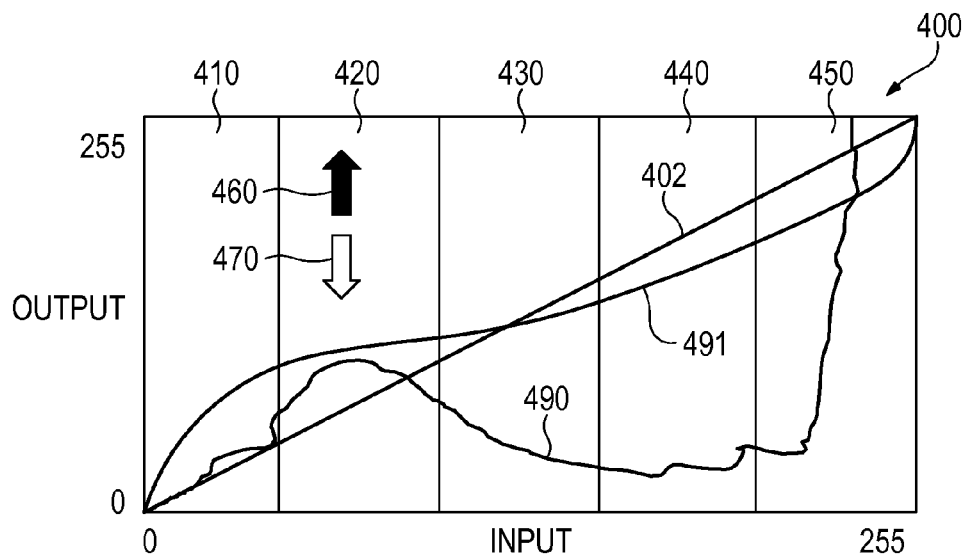
FIG. 4 depicts an illustration of an exemplary manner of adjusting an exposure of an image using histogram regions.

FIG. 4 depicts an illustration of an exemplary manner of adjusting an exposure of an image using histogram regions 410, 420, 430, 440, and 450. Referring to FIGS. 1A, 1B, 2, 3, and 4, a histogram 400 may represent a distribution of pixel values in image 145 and may be divided into regions 410, 420, 430, 440, and 450. Unlike histogram 155, an x-axis of histogram 400 may represent input values and a y-axis of histogram 400 may represent output pixel values. A diagonal 402 may run diagonally either from a lower left to an upper right value or from an upper left to a lower right value. Diagonal line 402 may represent input pixel values that are the same as output pixel values. For example, an output pixel value and an input pixel value in a center of diagonal line 402 may be 127.

Both input and output pixel values may have an associated range, e.g., 0 (dark) to 255 (light). Histogram 400 may be divided into more or less than five regions 410, 420, 430, 440, and 450 in response to a particular implementation of system 100 or system 200. Histogram 400 is shown divided into five regions 410, 420, 430, 440, and 450 for convenience only.

In an example, a user may move between the regions 410, 420, 430, 440, and 450 by actuating any mechanism configured to provide input to system 100 or to system 200, e.g., control switch 160 alone or in combination with menu selection switch 170. Each actuation of control switch 160 may result in stepwise highlighting a particular region for further action. The user may use an up arrow 460 or a down arrow 470 to change input pixel values in the highlighted or selected region up or down, respectively, by changing diagonal 402 to line 491. In an example, the user moved up diagonal 402 to line 491 in region 420 and moved down diagonal 402 to line 491 in region 440.

Figure 5:
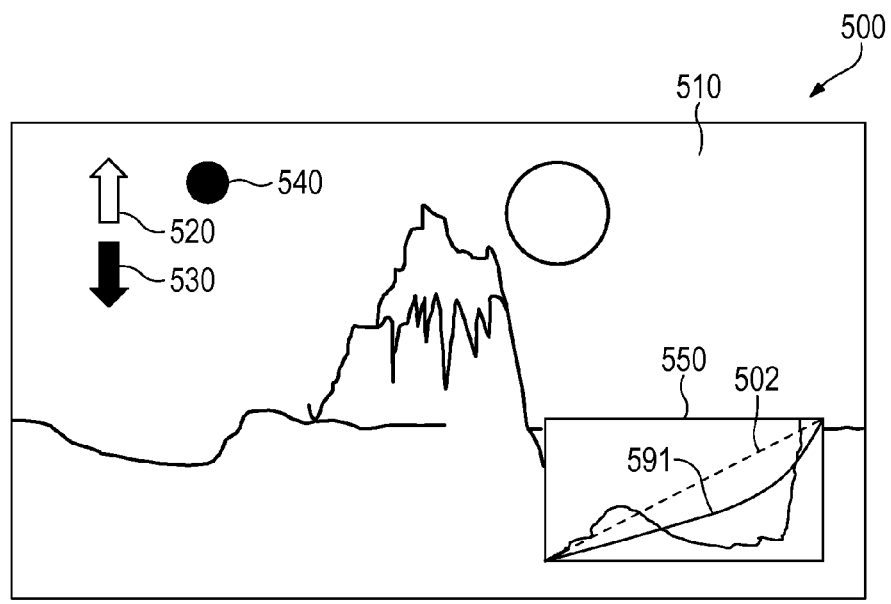
FIG. 5 depicts an illustration of an exemplary manner of adjusting an exposure of an image using a marker placed on a histogram.

FIG. 5 depicts an illustration of an exemplary manner of adjusting an exposure of the image 500 using a marker 540 placed on a histogram 550. System 100 may display image 500 on a background 510 of display, e.g., monitor 140 shown in FIG. 1. System 100 also may superimpose histogram 550 and marker 540 on image 500. Like histogram 400 shown in FIG. 4, histogram 550 may represent a distribution of pixel values for image 500 including a diagonal 502 that may represent input pixel values that are the same as output pixel values.

In an example, a user may move marker 540 by actuating any input mechanism on system 100, e.g., control switch 160 alone or in combination with menu selection switch 170. The user may actuate controller switch 160 initially to place the marker 540 on image 500 and subsequently to increase or decrease the pixel values at a location indicated by marker 540. In an example, the user may actuate a center button of controller switch 160 to initially place the marker 540 on image 500 and subsequently increase or decrease the pixel values at the location indicated by marker 540 by actuating the controller switch 160 up or down. Alternatively, the user may move marker 540 around image 500 by actuating the monitor 140's touch screen (not shown). In an example, marker 540 may identify pixels whose values input values may change according to increases or decreases in brightness or luminance values reflected in histogram 550. In another example, a user places marker 540 in an area of image 500 that identifies pixels having an input value of, e.g., 50 and 55. The user then may indicate, on the histogram 550 that the input values of the pixels identified by marker 540 change to output pixel values of, e.g., 65 and 80, respectively, as shown on a line 591. The user may indicate the change in pixel values, e.g., by moving dots on histogram 550 initially placed on diagonal 502 to destinations on line 591.

Other mechanisms may determine the pixel values that are affected by the increase or decrease in brightness values, including a system 100's ability to determine areas of the image 145 that are similar, e.g., blue sky, and thus, receptive to a similar change in brightness levels. In another example, as the user adjusts the exposure, an up arrow 520 or a down arrow 530 shows the direction in which the exposure is changing diagonal 502. System 100 may calculate new settings according to line 591 that system 100 may use to capture the image 145 in memory 265 (FIG. 2) in response to any input mechanism, e.g., shutter release switch 130.

Figure 6:
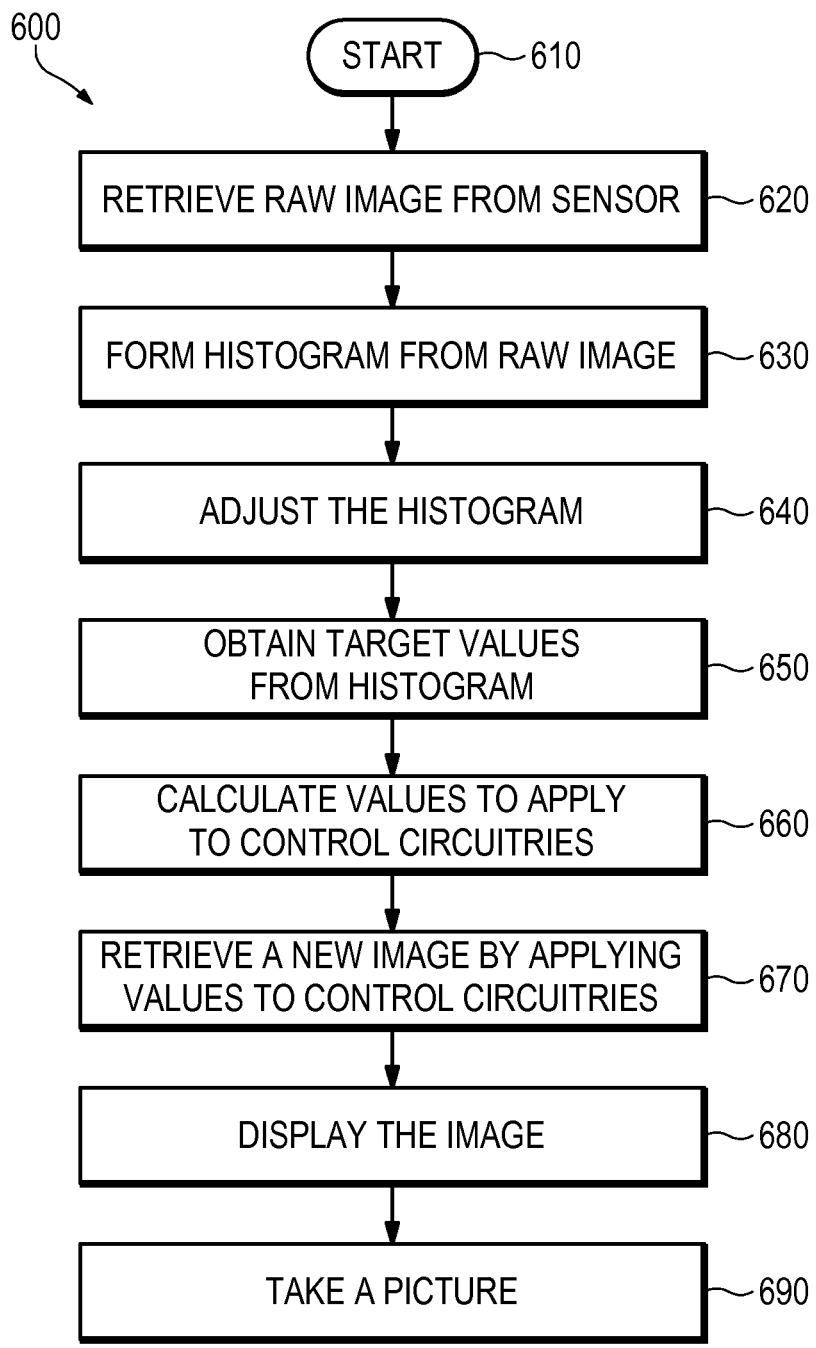
FIG. 6 depicts a flowchart of an exemplary method of adjusting an exposure of an image using a histogram.

FIG. 6 depicts a flowchart of an exemplary method 600 of adjusting an exposure of an image using a histogram. Referring to FIG. 6, method 600 may retrieve image data from a sensor at block 620 and may generate a histogram of the image corresponding to the image data at block 630. Method 600 may display the histogram superimposed on the image or instead of the image on a display. Method 600 may enable adjusting the histogram using any of a plurality of input mechanisms of system 100, e.g., control switch 160, at block 640. Method 600 may enable adjusting the histogram using a variety of mechanisms at block 640, including changing a diagonal line representative of input pixel values that are substantially similar to or the same as output pixel values.

Method 600 may enable adjusting the exposure of the image by enabling initially placing a dot on the diagonal line of the histogram and subsequently moving the dot to a destination location to modify the diagonal line and change the brightness values of the input pixels to output pixels corresponding to the modified diagonal line. Method 600 also may enable adjusting the exposure by dividing the histogram into regions and enabling the changing of brightness values of the input pixels associated with a selected region. Method 600 also may enable moving a marker on the image to change the brightness values of the input pixels having the brightness level of the pixels identified by the marker as reflected on the histogram of the image. Method 600 may obtain target values from the modified histogram at block 650 and may use the target values to calculate at least one control setting for system 100, e.g., aperture, shutter speed, amplifier gain, or the like, or any combination thereof at block 660. Method 600 retrieves the image from the sensor using the at least one control setting at block 670, displays the retrieved image on the display at block 680, and captures or stores the image in memory at block 690.

The invention claimed is:

1. A method, comprising:
    generating, by a computing device in a portable imaging device, a histogram comprising a first graph of input luminance values on an x-axis and output luminance values on a y-axis overlaid on a second graph of initial luminance values on the x-axis and a number of pixels on the y-axis associated with a plurality of pixels in an image prior to storage of the image in a memory device by activating a shutter switch;
    enabling adjustment of the second graph by adjusting the first graph;
    obtaining at least one target value from the adjusted second graph;
    generating, by the computing device, at least one control setting corresponding to at least one setting of the portable imaging device using the at least one target value; and
    capturing the image in the memory device using the at least one control setting by activating the shutter switch;
    wherein a body of the portable imaging device is configured to house the computing device or the memory device.

2. The method of claim 1, wherein generating the histogram further comprises generating, by the computing device, a histogram of a frequency distribution of a plurality of luminance values corresponding to the plurality of pixels in the image.

3. The method of claim 1, wherein enabling adjustment of the second graph further comprises:

enabling movement of at least one marker on the first graph from a source position to a destination position; and
    adjusting at least one value associated with the second graph in response to a value of the at least one marker at the destination position.

4. The method of claim 1, wherein enabling adjustment of the second graph further comprises:
    enabling placement of at least one marker on a display of the image; and
    adjusting at least one value associated with the second graph in response to a value corresponding to a pixel in the image located by the placement of the at least one marker.

5. The method of claim 1, further comprising retrieving raw image data from a sensor for generating the histogram.

6. The method of claim 1, wherein generating the histogram comprises counting a number of pixels at each of a plurality of luminance values.

7. The method of claim 1, further comprising replacing at least one initial luminance value associated with at least one pixel in the image in response to generating the histogram with at least one final luminance value associated with the at least one pixel in the image in response to generation of the second graph.

8. A method, comprising:
    generating, by a computing device in a portable imaging device, a histogram associated with a plurality of pixels in an image prior to storage of the image in a memory device by activating a shutter switch;
    enabling adjustment of the histogram to generate an adjusted histogram;
    obtaining at least one target value from the adjusted histogram;
    generating, by the computing device, at least one adjusted control setting by adjusting at least one control setting configured to control a corresponding at least one setting of the portable imaging device using the at least one target value; and
    capturing the image in the memory device using the at least one adjusted control setting by activating the shutter switch;
    wherein a body of the portable imaging device is configured to house the computing device or the memory device;
    wherein the histogram comprises a first graph overlaid on a second graph;
    wherein the first graph represents input luminance values on an x-axis and output luminance values on a y-axis;
    wherein the second graph represents input luminance values on the x-axis and a frequency of pixels on the y-axis;
    wherein enabling adjustment of the histogram to generate the adjusted histogram further comprises:
        dividing the histogram into a plurality of regions;
        enabling selection of one of the plurality of regions;
        enabling adjustment of the first graph in the selected one of the plurality of regions; and
        generating the at least one adjusted control setting based at least in part on the adjustment of the first graph.

9. The method of claim 8, wherein enabling adjustment of the at least one value comprises enabling adjustment of the at least one value via an actuator.

10. An apparatus, comprising:
    an image computing device configured to:
        generate a histogram comprising a first graph of input luminance values on an x-axis and output luminance values on a y-axis overlaid on a second graph of initial luminance values on the x-axis and a number of pixels on the y-axis associated with a plurality of pixels in an image prior to storage of the image in a memory device by activating a shutter switch;

enable adjustment of the second graph by adjusting the first graph;

obtain at least one target value from the adjusted second graph; and generate at least one control setting corresponding to at least one setting of the image computing device using the at least one target value; and an image sensor configured to capture the image in the memory device using the at least one control setting by activating the shutter switch.

11. The apparatus of claim 10, further comprising a display device configured to display the image.

12. The apparatus of claim 11, wherein the display device is configured to substantially simultaneously display the histogram overlaid at least a portion of the image.

13. The apparatus of claim 11, wherein the image computing device is further configured to:

enable the adjustment of the histogram via a graphical interface displayed on the display device.

14. The apparatus of claim 13, wherein the image computing device is further configured to:

enable movement of at least one marker overlaid on a display of the histogram from a source position to a destination position; and generate the at least one control setting by adjusting at least one value associated with the histogram in response to a value of the at least one marker at the destination position.

15. The apparatus of claim 13, wherein the image computing device is further configured to:

divide the histogram into a plurality of regions;

enable selection of at least one of the plurality of regions; and generate the at least one control setting by enabling adjustment of at least one value associated with the selected at least one of the plurality of regions.

16. The apparatus of claim 15, wherein the image computing device is further configured to:

enable adjustment of the at least one value via an actuator.

17. The apparatus of claim 13, wherein the image computing device is further configured to:

enable placement of at least one marker over at least one pixel of the image as the image is displayed on the display device; and generate the at least one control setting by adjusting at least one value associated with the histogram in response to a luminance value corresponding to the at least one pixel of the image.

18. The apparatus of claim 10, wherein the image computing device is further configured to generate the histogram by counting a number of pixels in the image at each of a plurality of luminance values.

19. The apparatus of claim 10, wherein the at least one control setting includes at least one of shutter speed, aperture, or gain.

20. The apparatus of claim 10, wherein the image sensor includes a charge-coupled device or a complementary metal oxide semiconductor device.

21. A portable imaging device, comprising:

a body configured to house:

means for generating a histogram comprising a first graph of input luminance values on an x-axis and output luminance values on a y-axis overlaid on a second graph of initial luminance values on the x-axis and a number of pixels on the y-axis associated with a plurality of pixels in an image prior to storage of the image in a memory device in the portable imaging device;

means for enabling adjustment of the second graph by adjusting the first graph;

means for obtaining at least one target value from the second graph;

means for generating at least one control setting corresponding at least one setting of the portable imaging device using the at least one target value; and means for capturing the image in the memory device by activating a shutter switch in response to generating the at least one adjusted control setting.

22. The portable imaging device of claim 21, wherein the histogram comprises a frequency distribution of a plurality of luminance values corresponding to the plurality of pixels in the image.

23. The portable imaging device of claim 21, further comprising:

means for enabling movement of at least one marker on the first graph from a source position to a destination position; and means for generating the at least one control setting by adjusting at least one value associated with the second graph in response to a value of the at least one marker at the destination position.

24. The portable imaging device of claim 21, further comprising:

means for dividing the histogram into a plurality of regions;

means for enabling selection of at least one of the plurality of regions; and means for generating the at least one control setting by enabling adjustment of at least one value associated with the selected at least one of the plurality of regions.

25. The portable imaging device of claim 24, further comprising:

means for enabling adjustment of the at least one value via an actuator.

26. The portable imaging device of claim 21, further comprising:

means for enabling placement of at least one marker on the first graph; and means for generating the at least one control signal by adjusting at least one value associated with the second graph in response to a value corresponding to a pixel in the image located by the placement of the at least one marker on the first graph.

27. The portable imaging device of claim 21, further comprising:

means for obtaining target values for the at least one control setting from the histogram; and means for generating the at least one control setting in response to the target values.

28. The portable imaging device of claim 21, further comprising:

means for enabling replacing at least one initial luminance value associated with at least one pixel in the image in response to the first graph with at least one final luminance value associated with the at least one pixel in the image in response to the second graph.

29. A computer readable storage device including executable instructions stored thereon that, when executed by a processing device, configure the processing device to perform operations comprising:

generating a histogram comprising a first graph of input luminance values on an x-axis and output luminance values on a y-axis overlaid on a second graph of initial luminance values on the x-axis and a number of pixels on the y-axis associated with a plurality of pixels in an image prior to activating a shutter switch that stores the image in a memory device housed in a portable imaging device;

enabling adjustment of the second graph by adjusting the first graph; and obtaining at least one target value from the second graph;

generating at least one control setting configured to control the portable imaging device using the at least one target value; and capturing, by activating the shutter switch, the image via an image sensor using the at least one control setting.

30. The computer readable storage device of claim 29, wherein the processing device is configured to perform operations further comprising:

storing the captured image in the memory device after capturing the image.

31. The computer readable storage device of claim 29, wherein the processing device is configured to perform operations further comprising:

controlling display of the image on a display device.

32. The computer readable storage device of claim 31, wherein the processing device is configured to perform operations further comprising:

controlling a substantially simultaneous display of the histogram over at least a portion of the image.

33. The computer readable storage device of claim 31, wherein the processing device is configured to perform operations further comprising:

enabling adjustment of the histogram via a graphical interface displayed on the display device.

34. The computer readable storage device of claim 29, wherein the processing device is configured to perform operations further comprising:

enabling movement of at least one marker overlaid on a display of the first graph from a source position to a destination position; and adjusting at least one value associated with the second graph in response to a value of the at least one marker at the destination position.

35. The computer readable storage device of claim 29, wherein the processing device is configured to perform operations further comprising:

dividing the histogram into a plurality of regions;

enabling selection of at least one of the plurality of regions; and enabling adjustment of at least one value associated with the selected at least one of the plurality of regions.

36. The computer readable storage device of claim 35, wherein the processing device is configured to perform operations further comprising:

enabling adjustment of the at least one value via an actuator.

37. The computer readable storage device of claim 29, wherein the processing device is configured to perform operations further comprising:

enabling placement of at least one marker over at least one pixel of the image as the image is displayed on a display device; and adjusting at least one value associated with the histogram in response to a luminance value corresponding to the at least one pixel of the image.

38. The computer readable storage device of claim 29, wherein the processing device is configured to perform operations further comprising:

generating the histogram by counting a number of pixels in the image at each of a plurality of luminance values.

39. The computer readable storage device of claim 29, wherein the processing device is configured to perform operations further comprising:

adjusting the at least one control setting by adjusting at least one of shutter speed, aperture, or gain.

\* \* \* \* \*